(12) United States Patent
Hunter

(10) Patent No.: US 7,584,132 B2
(45) Date of Patent: Sep. 1, 2009

(54) SYSTEM FOR FACILITATING SELECTION OF INVESTMENTS

(75) Inventor: Brian A. Hunter, Boston, MA (US)

(73) Assignee: Strategic Capital Network, LLC, Boston, MA (US)

( * ) Notice: Subject to any disclaimer, the term of this patent is extended or adjusted under 35 U.S.C. 154(b) by 1232 days.

(21) Appl. No.: 10/296,414

(22) PCT Filed: Feb. 5, 2002

(86) PCT No.: PCT/US02/03472

§ 371 (c)(1),
(2), (4) Date: Nov. 27, 2002

(87) PCT Pub. No.: WO02/063876

PCT Pub. Date: Aug. 15, 2002

(65) Prior Publication Data

US 2003/0126058 A1    Jul. 3, 2003

Related U.S. Application Data

(60) Provisional application No. 60/266,705, filed on Feb. 6, 2001.

(51) Int. Cl.
*G06Q 40/00* (2006.01)
(52) U.S. Cl. .................... 705/36 R; 705/40; 705/38
(58) Field of Classification Search ............. 705/36 R, 705/40, 35, 37, 7, 1, 10, 2; 273/256
See application file for complete search history.

(56) References Cited

U.S. PATENT DOCUMENTS 5,644,727 A * 7/1997 Atkins .................... 705/40
5,826,878 A * 10/1998 Kiyosaki et al. ............ 273/256
5,875,437 A * 2/1999 Atkins .................... 705/40

(Continued)

OTHER PUBLICATIONS

Lewison et al. "Cyberspace Investing" Jul. 1996, Journal of Accountancy, 182,N1 63(4).*

(Continued)

*Primary Examiner*—Kelly Campen
(74) *Attorney, Agent, or Firm*—Gordon E. Nelson

(57) ABSTRACT

A tool implemented in a computer system for analyzing the performance of a set of investment opportunities (FIG. 2). The tool operates in a screening mode whose displayed results permit the user to compare performance of the investment opportunities over time (211) and in a fitting mode whose displayed results permit the user to compare performance of pairs of the investment opportunities with regard to diversity of risk (213). In the screening mode, the investments are compared with regard to a number of different metrics. Included in the metrics is the Hunter Ratio, a pseudo-reliability metric. In the fitting mode, the correlation coefficient and Blend Anxiety of the returns of pairs of investment opportunities are measured. The Blend Anxiety is computed using the covariance of the returns. A graphical user interface for the tool permits the user to select investment opportunities, asset classes, benchmarks, kinds of calculations, and periods of time over which the calculations are to be performed (201). The results of both the screening mode and the fitting mode are displayed to the user in the form of spreadsheets.

18 Claims, 10 Drawing Sheets

U.S. PATENT DOCUMENTS

| | | | | |
|---|---|---|---|---|
| 5,999,918 | A | * | 12/1999 | Williams et al. .......... 705/36 R |
| 6,032,957 | A | * | 3/2000 | Kiyosaki et al. ............ 273/256 |
| 2002/0046187 | A1 | * | 4/2002 | Vargas et al. .................. 705/67 |
| 2002/0087446 | A1 | * | 7/2002 | Reddy ......................... 705/36 |
| 2002/0116237 | A1 | * | 8/2002 | Cohen et al. ................... 705/7 |
| 2002/0184128 | A1 | * | 12/2002 | Holtsinger ................... 705/35 |
| 2003/0033192 | A1 | * | 2/2003 | Zyman et al. ................ 705/10 |

OTHER PUBLICATIONS

Lacour-Little "Discrimination in Mortgage Lending: A Critical Review of the Literature" Jan. 1999, Journal of Real Estate Literature, V7N1, pp. 15-49.*

Rhoades et al. "Board Compsition and Financial Performance: A Metaanalysis of the Influence of Outside Directors" Spring 2000, Journal of Managerial Issues V12N1 pp. 76-91.*

* cited by examiner

Strategic Capital Allocation

| Fitting Analysis Time Interval: 803 Sep-97 through Jan-99 | Navellier 807 | 809 | Stafford Capital | | Wilshire Small Growth | |
|---|---|---|---|---|---|---|
| | Div | BA | Div | BA | Div | BA |
| Essex Management | 0.9601 | 2.5102 | 0.7982 | 2.1908 | 0.7318 | 1.7936 |
| Fuller and Thaler | 0.8781 | 2.2039 | 0.9425 | 2.4832 | 0.9810 | 2.3080 |
| Knappenberger | 0.7780 | 1.9184 | 0.8536 | 2.2095 | 0.8973 | 2.0741 |
| Navellier | 1.0000 | 2.4634 | 0.8917 | 2.3060 | 0.8294 | 1.9152 |
| Stafford Capital | 0.8917 | 2.3060 | 1.000 | 2.7147 | 0.9510 | 2.3055 |
| Wilshire Small Growth | 0.8294 | 1.9152 | 0.9510 | 2.3055 | 1.0000 | 2.1647 |

SYSTEM FOR FACILITATING SELECTION OF INVESTMENTS

CROSS REFERENCES TO RELATED APPLICATIONS

The present patent application claims priority from U.S. provisional patent application 60/266,705, Brian A. Hunter, et al., System for selecting portfolio managers, filed Feb. 6, 2001.

BACKGROUND OF THE INVENTION

1. Field of the Invention

The invention relates generally to systems for presenting information to users in a manner which aids the user in selecting from among alternatives and more specifically to interactive systems which aid investors in selecting investments that best meet the investor's requirements.

2. Description of Related Art

The development of networked computing, and of the Internet in particular, has made life both easier and more difficult for the investor. Life has become easier because it is easier than ever before to find and retrieve the data that is needed to make wise investment decisions and to manipulate the data once it has been retrieved. Life has become harder because the very plethora of data and the number of ways of manipulating it complicate the process of turning the data into the information the investor needs: namely, information which permits the investor to choose wisely among alternative investment possibilities.

The bases upon which a wise investor chooses his or her investments are return, risk, and diversity. The investor wants investments which offer a relatively good return at a relatively low risk and further wants diversity among the risks that his investments are exposed to, so that circumstances which produce a loss on one investment do not produce losses on others of the investments. Thus, what the investor needs to choose wisely is a way of looking at data about individual investment possibilities which reveals the following for each investment of interest with regard to a period of time:

the overall return yielded by the investment over the period as compared to a benchmark of interest;

the volatility of the investment over the period, which provides a measure of its risk; and the resiliency of the investment with regard to market shocks over the period.

What an investor is of course looking for is investments which maximize return and resiliency while minimizing volatility.

Once the investor has found a number of investments of interest, the investor needs to look at groups of the possible investments to see how investments in the group relate to each other from the point of view of diversity of risk. Diversity of risk measures the degree to which the risks that affect the value of one investment are independent of the risks that affect another investment. In general, the greater the diversity of risk in a set of investments, the more secure the value of the entire set of investments is.

What is needed is a single easy-to-use tool which provides the above information to the investor and provides it in a fashion which makes it easy for the investor to compare the risks and returns of individual investment possibilities and to see how the investment possibilities relate to each other with regard to diversity of risk. It is an object of the invention disclosed herein to provide such a tool.

SUMMARY OF THE INVENTION

The tool of the invention analyzes the performance of a set of investment opportunities. The tool includes an analyzer that analyzes investment performance information covering a period of time for each investment opportunity of the set and a graphical user interface that is usable by a user of the apparatus to control operation of the analyzer and display results of the analysis. The analyzer operates in a screening mode whose displayed results permit the user to compare performance of the investment opportunities and in a fitting mode whose displayed results permit the user to compare performance of pairs of the investment opportunities with regard to diversity of risk.

In further aspects of the invention, the analyzer computes the Hunter Ratio, a pseudo-reliability metric, for each of the investment opportunities in the set and a BLEND ANXIETY™ metric for pairs of the investment opportunities. In a preferred embodiment, the analyzer computes the Hunter Ratio in the screening mode and the Blend Anxiety metric in the fitting mode. In the preferred embodiment, the Blend Anxiety metric of a pair of investment opportunities is the covariance of the pair's performance.

In another aspect of the invention, the tool can be used for a method of investment analysis in which the investment opportunities are first analyzed to determine their Hunter Ratios and pairs of the investment opportunities are then analyzed to determine their Blend Anxiety.

The tool's graphical user interface further permits the user to select a subset of the potential investment opportunities and to do so according to asset classes of the potential investment opportunities. The user can also select a set of operations to be performed on the investment performance information by the analyzer and a portion of the period of time for which the investment performance information is available. The operations will be performed on the investment performance information for the selected portion of the period of time. The user can further select subsets of the investors from which the pairs for which the Blend Anxiety is computed are taken. Results of the analysis are output to spreadsheets which can be manipulated in the customary fashion by the user.

Other objects and advantages will be apparent to those skilled in the arts to which the invention pertains upon perusal of the following Detailed Description and drawing, wherein:

BRIEF DESCRIPTION OF THE DRAWING

FIG. 4 shows details of screening tab 211;

FIG. 8 shows a spreadsheet with the output of the fitting operation; and

Figure 1:
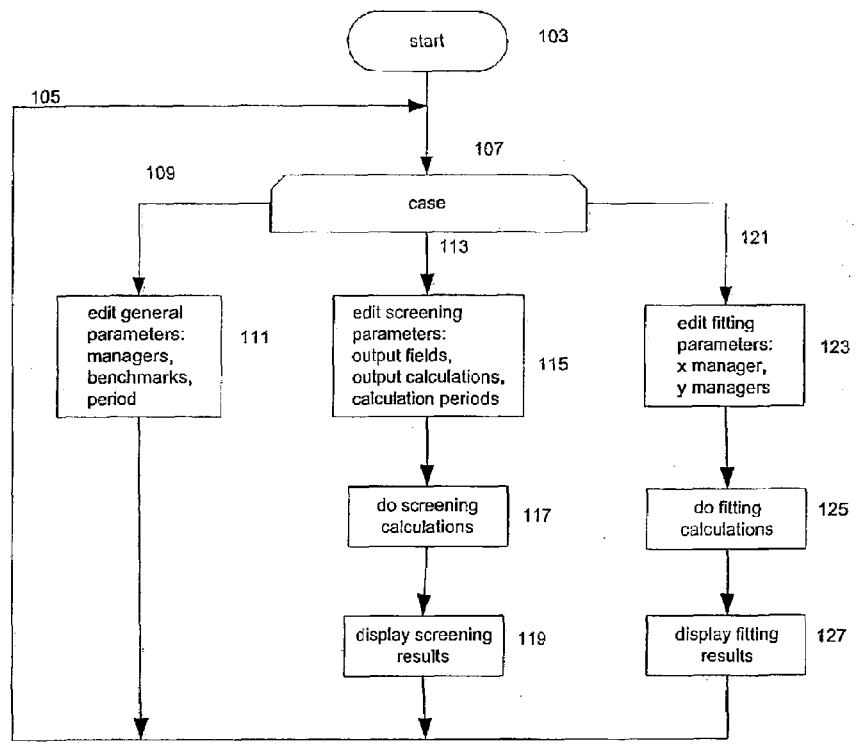
FIG. 1 is a flowchart showing operation of the tool for facilitating selection of investments.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with an overview of the tool as it appears to the user and will then describe an implementation of the tool.

Functional Overview of the Tool: FIG. 1

The tool is implemented in a standard computer system, with a standard graphical user interface (GUI) in which the output is a display on a display device such as a CRT and inputs to active areas on the display are made using a keyboard and a pointing and selection device such as a mouse. The user can do three things with the tool:

- select asset classes and investment opportunities belonging to the asset classes to be investigated and benchmarks and time periods to be used in the investigation; an asset class is to be understood in the present context as any set of investment opportunities which share a common characteristic, including belonging to a particular investment strategy; benchmarks are measures such as the rate of return on U.S. bonds against which other investments are compared;
- screen the investment opportunities by seeing how they compare according to various measures of investment value for the selected benchmarks and time periods; and
- fit investment opportunities to see the extent to which they increase the diversity of risk in a set of investment possibilities and therefore reduce the overall risk of the set.

FIG. 1 is a flowchart 101 which shows operation of the tool at the level just described. A user starts using the tool at 103, and the tool executes loop 105 until the user desires to stop. At any point in his or her use of the tool, the user has the choice to perform activities belonging to one of three general classes, as shown by case statement 107:

- In selection branch 109, editing the general parameters which determine the asset classes and investment opportunities to be investigated, the benchmarks, and the time period (111).
- In screening branch 113, the following activities:
  - editing screening parameters including output fields, output calculations to be performed to produce additional output fields, and time periods for the output calculations (117);
  - doing the output calculations; and
  - displaying the output fields.
- In fitting branch 121, the following activities:
  - editing fitting parameters that determine which investment opportunities are compared which each other for diversity of risk (123);
  - doing the fitting calculations (125); and
  - displaying the fitting results (127).

In general, a user of the tool will proceed as follows: having selected asset classes, investments belonging to the asset classes, periods of time, and output calculations of interest in selection branch 109 and having used screening branch 113 to see the performance of the selected investment opportunities, the user will select a promising subset of the investment opportunities that were screened in screening branch 113 for fitting in fitting branch 121 to see what the diversity of risk offered by the investments in the promising subset is. The user may then use the diversity of risk in making his or her final selections from among the investments originally selected in selection branch 109.

Details of the Tool as Seen by the User

In a preferred embodiment, the investment opportunities that the user is comparing are managed investment funds; in the user interface, these managed investment funds are termed managers. It is, however, important to note that the operations performed by the tool could be performed with regard to any investment opportunity for which data is available which is analogous to that used in the present invention to analyze fund managers.

Figure 2:
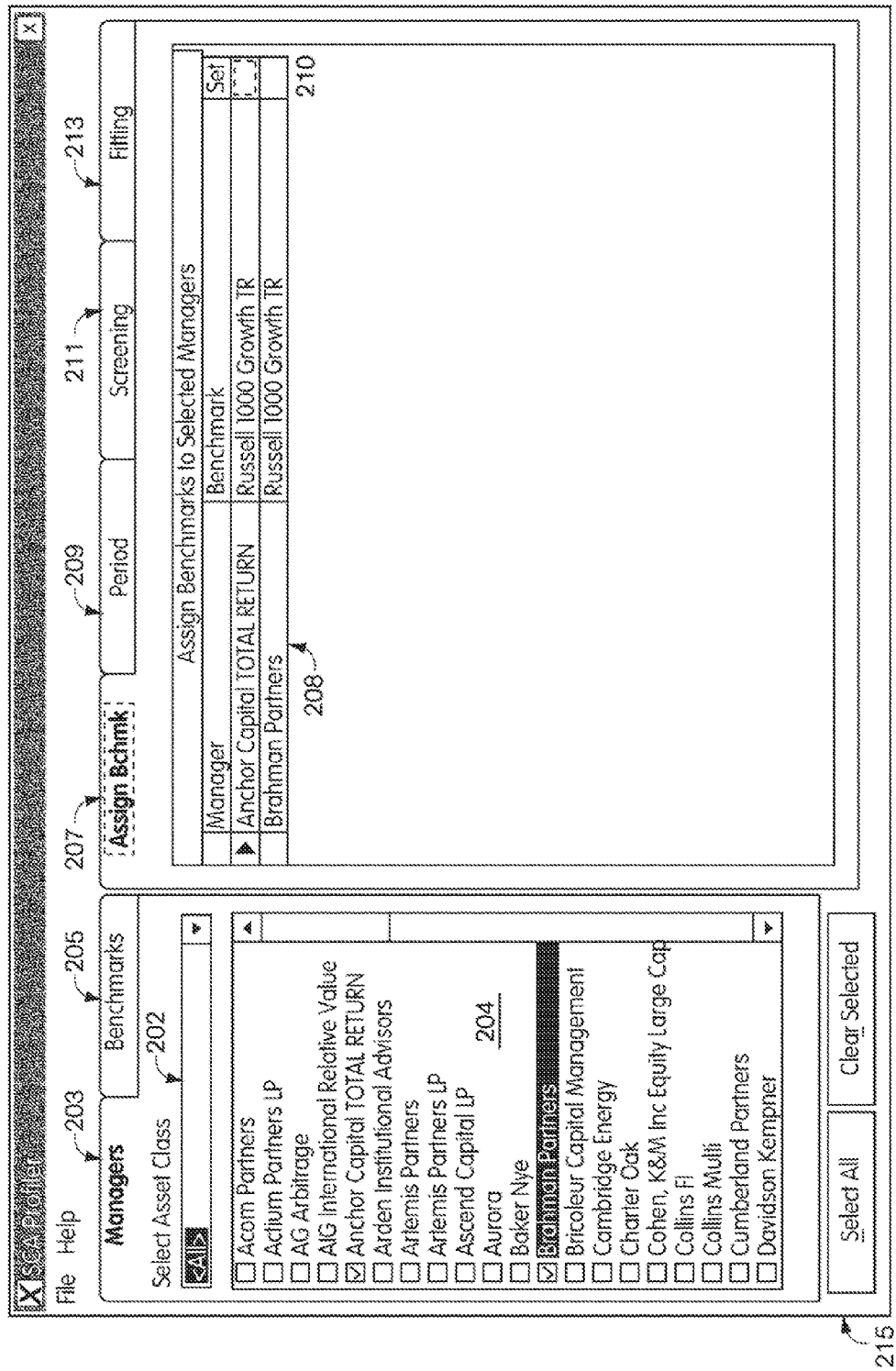
FIG. 2 shows the initial window of the tool's user interface.
Figures 1, 5:
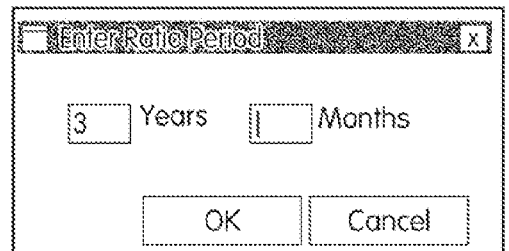
FIG. 5 shows subwindows used in setting up screening.
Figures 2, 5:
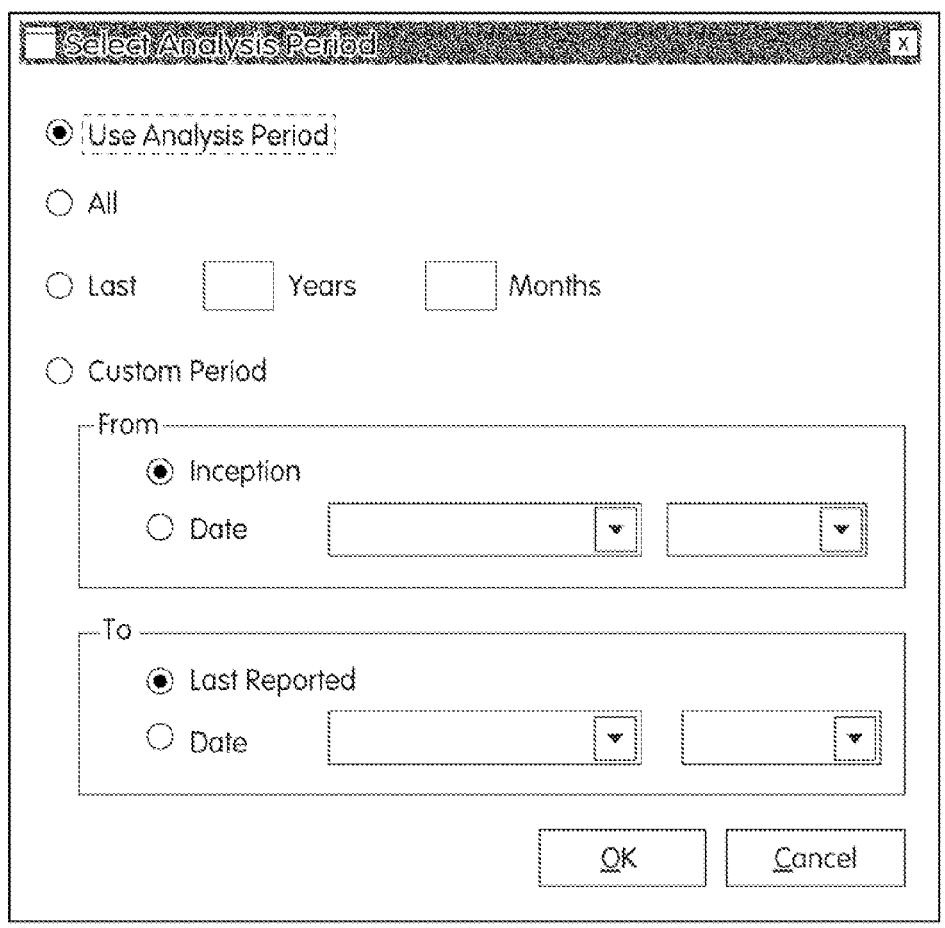
Figures 3, 5:
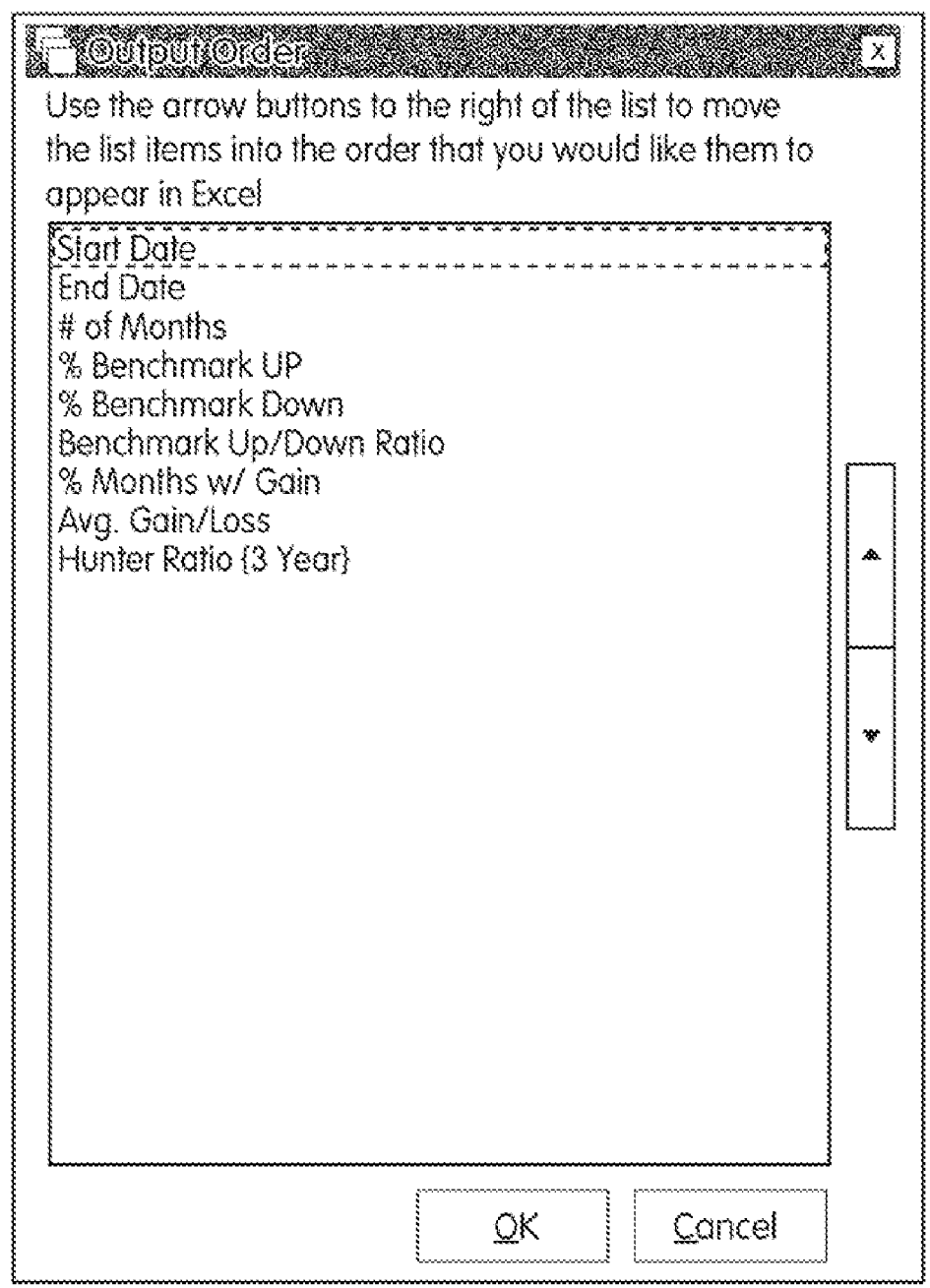
FIG. 3 shows details of period tab 209.

Windows for Select Branch 109 FIGS. 2 and 3

When a user begins using the tool, the first window encountered is window 201 shown in FIG. 2. In terms of FIG. 1, window 201 belongs to branch 109. Window 201 permits the user to specify managers and benchmarks to be used in evaluating the selected managers. Tab control 203 allows the user to switch between manager and benchmark views (205). Manager view 203 includes a list 204 of managers; individual managers in the list may be selected using the check boxes to the left of the list entries. The buttons at 215 permit the user to select all managers in list 204 or to clear all managers in list 204. "Select Asset Class" dropdown 202 allows the user to filter the list by asset class; when an asset class is selected, only the managers who manage investments belonging to that asset class appear in list 204. The "All" option shows all managers for which the tool has performance data. Tab 207 is the Assign Benchmark tab. When a manager is selected from list 204, it is added to list 208 of manager-benchmark pairs. The manager will then be screened against the selected benchmark. Clicking "Set" button 210 in a list entry in list 208 will update all managers selected for the benchmark with the information for the benchmark defined in that row. As will be explained in more detail later, period tab 209 permits the user to specify an analysis period for the screening and/or fitting, tab 211 selects the window for the screening operation, and tab 213 selects the window for the fitting operation.

FIG. 3 shows window 301 of branch 109 with a detailed view of tab 209 which the user employs to determine the period of time to be used in the screening and/or fitting analyses of the managers selected in tab 203 with regard to the benchmarks selected with regard to tab 207. The available options are:

- All 303—all reported periods for each selected manager;
- Maximum common periods across selected-managers 305—the timeframe is limited to the maximum intervals that all selected managers share
- Last 307—The time period is limited to the most recent entered years/months (e.g. 6 months, 3 years, etc.)
- Custom Period 311—User may enter any time period. A start date for the period can be specified, or the user may choose "From Inception" (313). Similarly, the user may also specify an ending date, or choose "Last Reported" (315).

Figure 4:
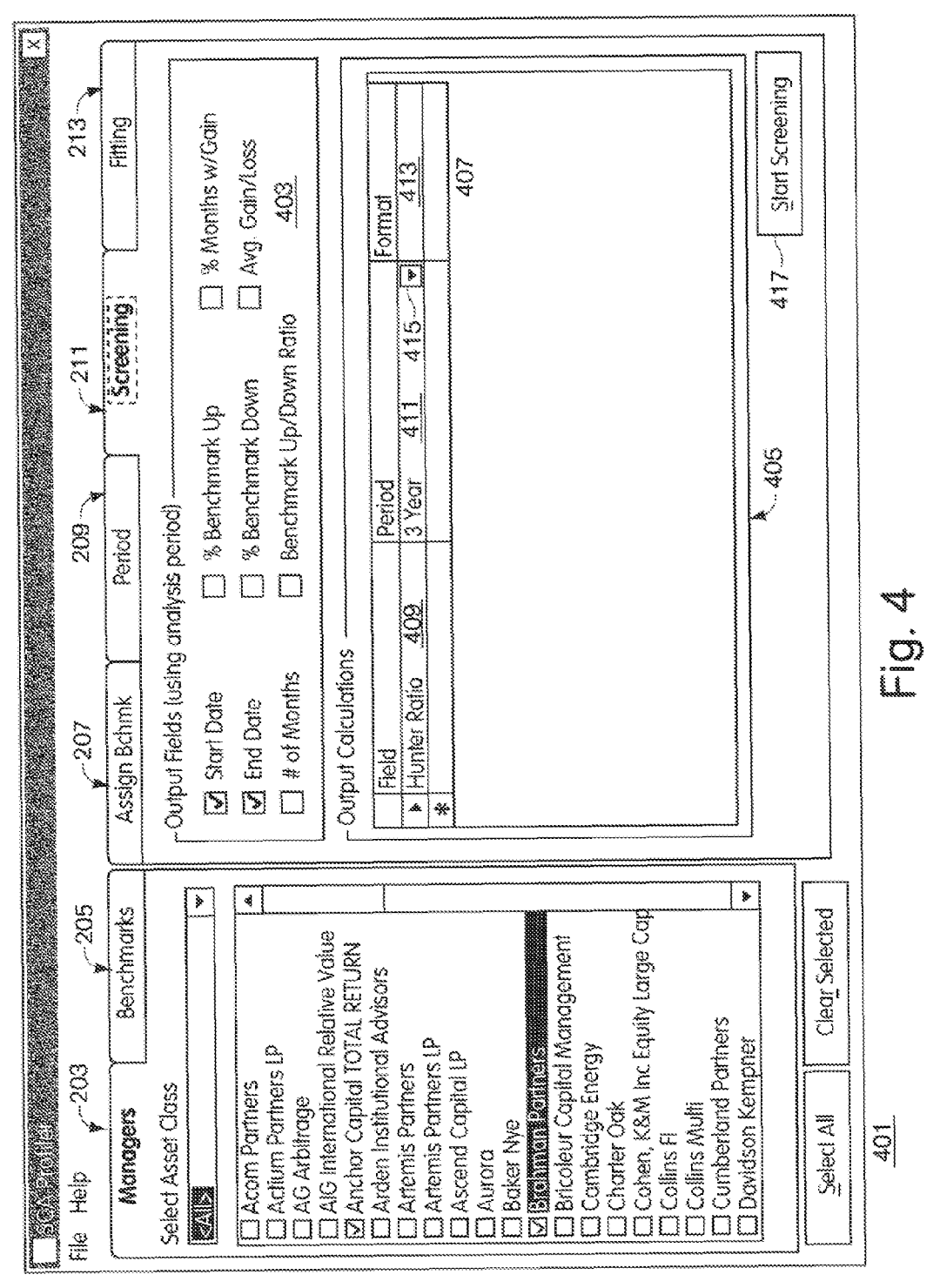
Figure 6:
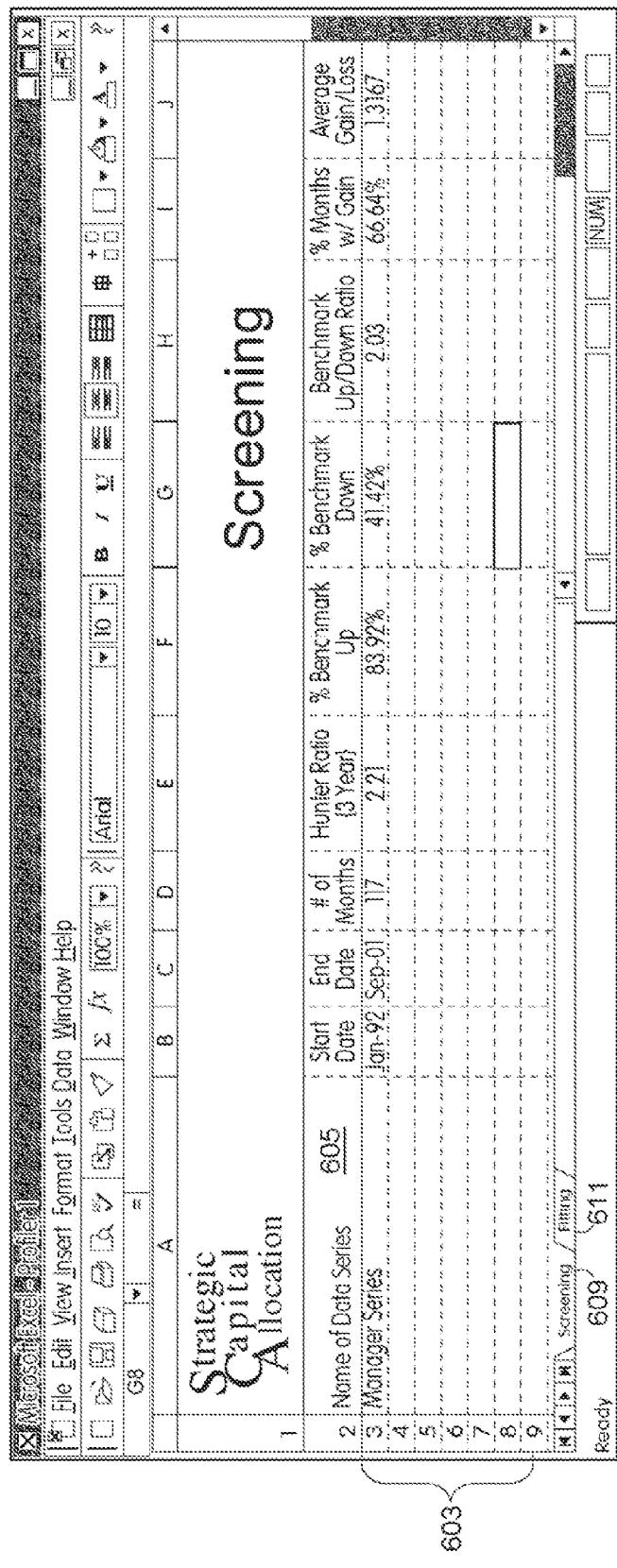
FIG. 6 shows a spreadsheet with the output of the screening operation.

Windows for Screening Branch 113: FIGS. 4-6

FIG. 4 shows window 401 that appears when the user selects screening tab 211. This tab corresponds to block 115 in flowchart 101. It permits the user to further define a screening operation that uses the managers, benchmark, and time period selected using screens 201 and 301. Using tab 211, the user may define the fields he or she wishes to appear in the display produced for the results of the screening operation and may also specify that the screening operation be performed. Beginning at 403, that portion of tab 211 provides checkboxes which permit the user to select a number of fields to appear in the output. Portion 405 permits the user to select operations from a list 407 of operations. When an operation is selected, a field containing the results of the operation appears in the display produced for the results of the screening operation. When the user has finished setting up the scan using screen 401, the user clicks on button 417 to start the scan.

Continuing with details of portion 403, the start date, end date, and # of months check boxes cause fields to be produced with time expressions as determined by the settings of time tab 209. The values that appear in the remaining fields are defined relative to the value of the benchmark that was assigned using tab 207. The values are calculated as follows:

% Benchmark Upside—Calculated as (Total Positive Returns)/(Total Positive Benchmark Returns)

% Benchmark Downside—Calculated as (Total Negative Returns)/(Total Negative Benchmark Returns)

% Benchmark Up/Down Ratio—Calculated as (% Benchmark Upside)/(% Benchmark Downside)

% Periods w/Gain—Calculated as (Number of periods w/positive returns)/(Total number of periods)

Average Gain To Loss—Calculated as (Sum of positive returns/Number of positive returns)

Output calculations portion 405 permits the user to specify calculations that are to be performed using the data for the selected managers and benchmarks. The output calculations are selected using subwindow 407, which permits selection of the calculation (409), the period over which it is to run (411), and the format 413 in which it is to be displayed. Button 415 permits the user to customize the calculation period. Only a single output calculation, the Hunter Ratio, is specified at 407; however, the output calculations which may be specified using window portion 405 include the following in the preferred embodiment: the Sharpe ratio, rolling returns, drawdown, standard deviation, and the Hunter ratio. More than one such calculation may be specified for a given screening. With the exception of the Hunter ratio, these calculations are well known. All of these calculations employ rolling returns for the manager and/or the benchmark. The rolling return is calculated as follows:

Rolling Returns—the rolling return for the analysis period:
  For each return in series
  Rolling Return=Rolling Return * (1+Period Return)
  Total Return=Rolling Return−1
  Next In summary, the calculations are performed as follows:

Drawdown—Ratio of the series to the series benchmark over a defined period of market volatility: (Rolling Return for period)/(Rolling Benchmark Return for period)

Sharpe Ratio—Calculated as:

$$\frac{\text{Period Rolling Return} - \text{Period } T\text{-Bill Rolling Return}}{\text{Standard Deviation(Period Returns)}}$$

Hunter Ratio—The average of all n-period Sharpe ratios divided by the standard deviation of all n-period Sharpe ratios for a series. Calculated as:

$$\text{Average(Sharpe Ratio over n periods)/StdDev(Sharpe Ratio over n periods)}$$

Computation of the standard deviation is too well known to require further explanation.

The Hunter Ratio is a novel metric. It reflects a manager's performance persistence over time while minimizing period selection bias. It thus provides a notion of the manager's reliability without the computational requirements of reliability measurements such as those described in PCT/US01/00636, Hunter, et al., Resource allocation techniques, filed Jan. 9, 2001, published on Jul. 26, 2001 as WO/2001/053998, and hereby incorporated by reference into the present patent application for all purposes. For this reason, the Hunter Ratio is termed a pseudo-reliability measure. The Hunter Ratio is measured over a minimum of 3 year rolling periods from inception of a manager's performance and becomes more statistically valid at 5 and 7 year rolling periods.

Coupling the Hunter Ratio with the other statistics produced in screening adds still more perspective. For example, we can screen over shorter term convulsive periods pertinent to the asset class of the managers being screened and use drawdown to take a snapshot of how each manager looks under the microscope of disaster periods. The Hunter Ratio and drawdown together give a unique picture of the likelihood of a manager to weather both the worst market storms and more moderate intermittent market pressures and at the same time deliver an absolute upside at a margin above both competitors and a relevant benchmark for the asset class in question.

FIG. 5 shows a number of subwindows that are used with window 401 to further configure screening. Subwindow 501 appears when button 415 is clicked on for the Hunter Ratio entry in list 407; it permits the user to define one or more periods over which the Hunter Ratio is to be calculated. Subwindow 503 appears when button 415 is clicked for any of the other output calculations; it permits the user to specify that the analysis period indicated on period tab 209 be used or to specify one or more special analysis periods for the computation. The special periods may be specified in the same way as time periods on period tab 209. The results of the calculation for each of the time periods selected for the Hunter Ratio or the other computations will appear in a separate field in the spreadsheet. Where the calculation involves a benchmark, it is the benchmark selected using tab 207. Subwindow 505 appears after the user clicks on start screening button 417. It permits the user to specify the order in which the fields will appear in the rows of the spreadsheet that is the result of the screening operations. The vertical order of the fields in subwindow 505 becomes the left-to-right order of the fields in the spreadsheet row.

In a preferred embodiment, the results of the calculations specified using screening tab 211 on the managers and benchmark specified using tabs 203 and 205 for the period specified using tab 209 are output to a spreadsheet. FIG. 6 shows the spreadsheet as it appears where the user has specified a benchmark and four managers. Spreadsheet 601 has two worksheets, one, identified by tab 609, which shows the results of screening, and one, identified by tab 611, which shows the results of fitting. In spreadsheet 601, the user has selected tab 609. The spreadsheet has a row 605 in table 603 for each of the selected managers. The fields in the row correspond to those selected using tab 211; they are ordered as the user specifies in subwindow 505 (note, however, that the order actually shown in subwindow 505 was not used for spreadsheet 601). Header 607 has the titles of the fields. Any of the usual spreadsheet operations can of course be performed on table 603, including sorting the rows according to the values in a selected field. Here, as shown at 613, the rows have been sorted by the value of the Hunter Ratio.

Figure 7:
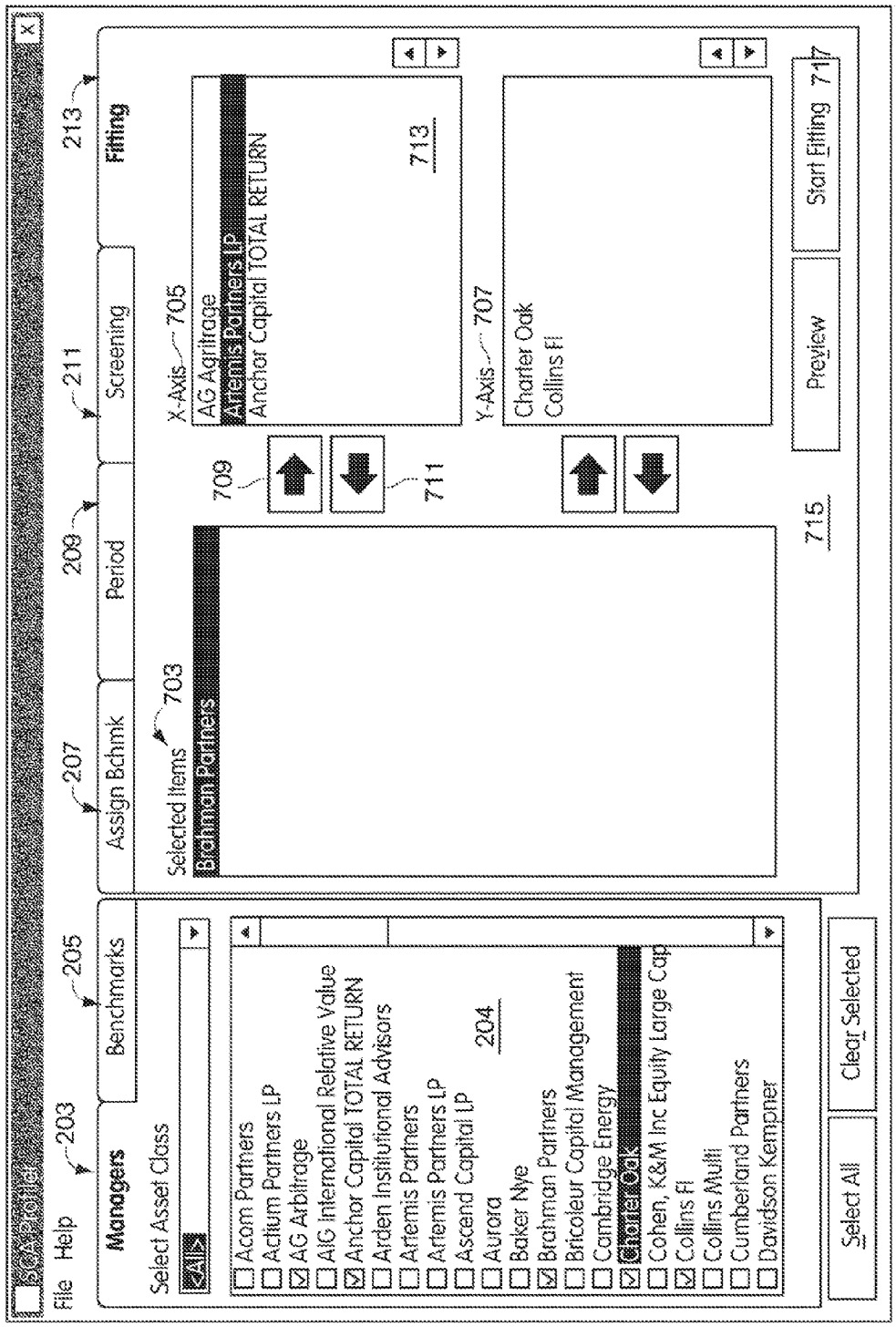
FIG. 7 shows details of fitting tab 213.

Windows for Fitting Branch 121: FIGS. 7 and 8

The fitting operation compares pairs of managers from the point of view of diversity of risk. This is done by computing the correlation and the covariance for the returns of the pair. The greater the diversity of risk, the lower the correlation and covariance for the pair. The advantage of computing the covariance in addition to the correlation is that covariance is a more powerful indicator of diversification. It is more powerful because it measures diversification and the impact of the blending of the volatilities of the two managers. Mathematically, the covariance is the product of the correlation coefficients of the two managers multiplied by their respective standard deviations. So, you can have two highly volatile managers in two very different asset classes and if the correlation is near zero then they may very well be an excellent fit or, vice versa, a high correlation where the managers are less volatile can result in a very poor combination that yields a lot of investor anxiety when both deliver large negative returns at the same time. It is this relationship between the covariance and investor anxiety which has lead the developers of the present invention to use the term Blend Anxiety in their user interface. Other measures of Blend Anxiety may be used in other embodiments of the tool. One such measure is provided by the investment allocation techniques described in PCT/US01/00636, cited above.

FIG. 7 shows window 701, in which the details of fitting tab 213 can be seen. Fitting tab 213 permits the user to select two groups of managers upon which the fitting operation will be performed. One group is termed the x axis group and the other is termed the y axis group. Each member of the x axis group is fitted to each member of the y axis group. The fitting operation is done over a period that is specified using tab 209.

The groups of managers are selected from the set of managers that was previously specified using tab 203. When the user selects fitting tab 213, the managers that were previously selected at 204 appear in selected items field 703. Buttons 709 and 711 can be used to move the managers in field 703 between that field and x-axis field 705, which lists the managers currently selected for the x-axis group. The equivalent buttons for y-axis field 707 can be used to move managers between field 703 and y-axis field 707, which lists the managers currently selected for the y-axis group. Managers can be ordered within field 705 by using buttons 713, and the same can be done within field 707 using the equivalent buttons there. Clicking on preview button 715 provides a preview of the arrangement of the spreadsheet that will be produced by the fitting operation, while clicking on start fitting button 717 begins the fitting operation on the selected X axis group and Y axis group.

FIG. 8 shows the spreadsheet worksheet 801 that results from the fitting operation. Worksheet 801 appears when the user selects tab 611. In this case, worksheet 801 shows the result of applying the fitting operation to an X-axis group 806 of three managers and a Y-axis group 802 of six managers. The fitting operation is for the time period specified at 811. In general, each member of the Y axis group has a row 803 in the spreadsheet; each member of the X axis group has two fields 805 in each of the rows. The contents of the fields for a given X axis manager in the row belonging to a given Y axis manager are the correlation coefficient and the covariance values for the pair made up of the given X axis manager and the given Y axis manager. In row 803, field 807 contains the correlation coefficient and field 809 contains the covariance value. In the display, they are termed "Diversity" (Div) and "Blend Anxiety" (BA). The arrangement shown in window 801 makes it easy for users of the tool to understand how two investment possibilities relate to each other with regard to diversity of risk.

Measuring Reliability of Combinations of Potential Investments

Together, the Hunter Ration and Blend Anxiety provide users of the tool with a way of measuring the reliability of combinations of potential investments. As indicated above, the Hunter Ratio reflects a manager's performance persistence over time, and thus measures reliability of a manager. Thus, in order to find reliable combinations of managers, the user can first screen the managers in question to determine their Hunter Ratios, and then fit pairs of managers with acceptable Hunter Ratios. The pairs with the best fits make up a set of managers which can then be further analyzed using the resource allocation techniques described in PCT/US01/00636, cited above.

Figure 9:
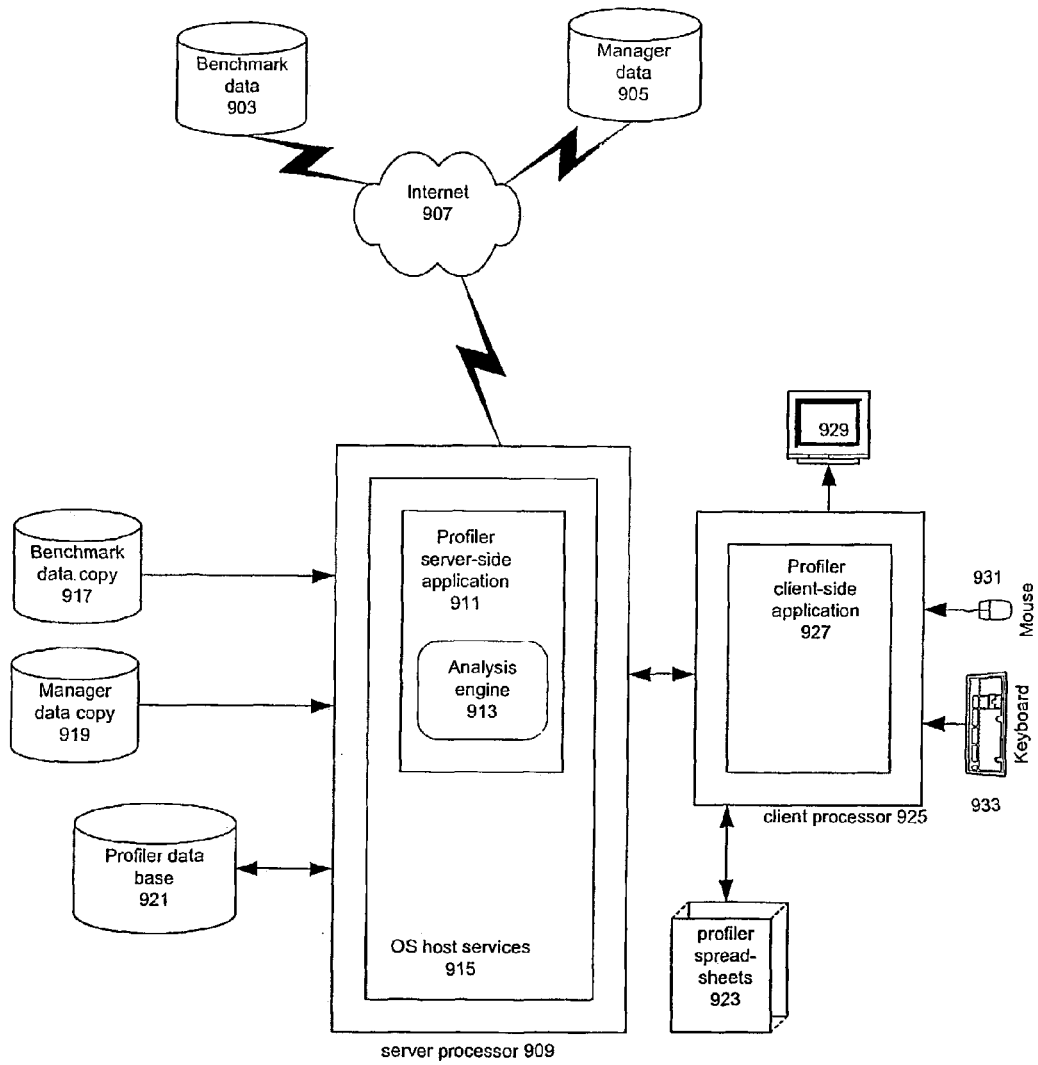
FIG. 9 is a block diagram of a computer system in which the tool may be embodied.

Implementation of the Tool in a Computer System: FIG. 9

FIG. 9 shows a computer system 901 in which a preferred embodiment of the tool is embodied. In the preferred embodiment, the tool is termed the ProFiler. System 901 has two main components: a server processor 909 and one or more client processors 925 connected to the server processor. Server processor 909 further has a connection to Internet 907 and via that connection to databases containing benchmark data 903 and manager data 905.

Continuing with the details of server processor 909, server processor 909 further includes copy databases 917 and 919. Copy database 917 contains a copy of data from benchmark data 903 and copy database 919 contains a copy of data from manager data 905. The copies 917 and 919 are obtained by downloading via Internet 907 from databases 903 and 905. In a preferred embodiment, benchmark database 903 is a commercial database provided by Ibbotson Associates and manager data 905 is the commercial Plan Sponsor Network database provided by Effron. ProFiler database 921 is a MICROSOFT® ACCESS® database made by Microsoft Corporation.

When the ProFiler is operating, profiler database 921 contains benchmark information from database 917 and manager information from database 919 and may also contain further manager information provided by users of the ProFiler. In a preferred embodiment, data base 921 is implemented in a Microsoft® Access database system. Server processor 909 further includes ProFiler server side application program 911, which performs those parts of the operation of the ProFiler which are done on server processor 909 and analysis engine 913, which is the part of application program 911 which does the calculations necessary to produce the output spread sheets. Server-side application program 911 is hosted in OS host services program 915, which provides application program 911 with middleware services such as connection pooling, instance management, and threading. In a preferred embodiment, server processor 909 is running under the Microsoft WINDOWS SERVER® operating system and OS host services 915 is embodied as Windows Component Services.

Client processor 925 is a standard PC running a Microsoft WINDOWS® operating system. The operating system provides a GUI which is displayed on monitor 929 and receives inputs from mouse 931 and keyboard 933. Also included in client processor 925 is an EXCEL® spreadsheet program which manipulates profiler spreadsheets 923. ProFiler client-side application 927 receives inputs from and provides outputs to the GUI and also provides result data received from server-side application 911 to profiler spreadsheets 923.

Prior to commencing operation of the profiler, a manager of server processor 909 downloads copy 917 of benchmark data from database 903 and copy 919 of manager data from database 905. When a user at client processor 925 begins execution of profiler client-side application 927, server-side application 911 provides initial window 201; after the user has selected managers, a benchmark, a period, and the screening operation, and for the screening operation, the results fields to be output and the operations to be performed, server-side application 911 responds to these inputs when the user clicks on start screening button 417 by copying the data for the selected managers and benchmark for the selected period from databases 917 and 919 to database 921. Analysis engine 913 then performs the specified operations and outputs the results to client-side application program 927, which incorporates them into the screening worksheet of the ProFiler spreadsheet in spreadsheets 923. The user of client processor 925 can then use Excel to manipulate the spreadsheet in the usual fashion.

If the user instead selects the fitting operation, the user may again select managers and a time period and can also assign managers to either the X-axis group or the Y-axis group. When the user has done these things using window 701 and clicks on start fitting button 717, analysis engine 913 computes the correlation coefficient and the covariance for each possible pairing of a manager from the X-axis group with a manager from the Y-axis group and outputs the results to client-side application program 927, which incorporates them into the fitting workshop of the ProFiler spreadsheet in spreadsheets 923. Again, the user of client processor 925 can then use Excel to manipulate the spreadsheet in the usual fashion.

CONCLUSION

The foregoing Detailed Description has disclosed to those skilled in the relevant technologies the best mode presently known to the inventor of making and using his tool for analyzing investment opportunities and has further disclosed the best modes presently known to the inventor of computing the Hunter Ratio and Blend Anxiety and using these metrics to analyze investment opportunities.

While the tool provides a particularly good environment for the application of the Hunter Ratio and Blend Anxiety to the problem of analyzing investment opportunities, the Hunter Ration and Blend Anxiety are useful in many other investment analysis contexts and with many other investment analysis tools. The user interface disclosed herein is further optimal for users of the tool, but many other kinds of user interfaces are possible, including ones which offer subsets of the functionality provided by the disclosed user interface and ones which use different graphical user interfaces or even character-based user interfaces. Similarly, it is particularly advantageous to output the results of operations performed by the tool to spreadsheets, where user of the tool can easily further manipulate the results, but in other embodiments, any kind of graphical or character display device may be used to display the results. Finally, the particular hardware embodiment disclosed herein is particularly advantageous when the investment performance information is available on the Internet and is being shared by a group of users, but implementations of the tool may range across the spectrum from an implementation in which the user interface for the tool is implemented in a browser, with all computation and display creation being done by a server that is connected by a network to the system in which the browser is operating to an implementation in which the tool is implemented in a stand-alone PC or other computer system. The investment performance data may be obtained via the Internet, as in the preferred embodiment, by means of portable media such as CD-Rom or magnetic disks, or may be input by the user.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for analyzing the performance of a set of investment opportunities,
   the apparatus comprising:
   an analyzer that analyzes investment performance information covering a period of time for each investment opportunity of the set; and
   a graphical user interface that a user of the apparatus uses to control operation of the analyzer and display results of the analysis,
   the analyzer analyzing the investment performance information in a screening mode whose results, as displayed in the graphical user interface, permit comparison of the performance of the investment opportunities by the user and further analyzing the investment performance information in a fitting mode whose results, as displayed in the graphical user interface, permit comparison of performance of pairs of the investment opportunities by the user with regard to diversity of risk.

2. The apparatus set forth in claim 1 wherein:
   the user uses the graphical user interface to select a subset of the set of potential investment opportunities; and
   the analyzer analyzes the investment performance information for the selected subset in the screening and/or fitting mode.

3. The apparatus set forth in claim 2 wherein:
   the investment performance information includes a plurality of asset classes, each of the investment opportunities belonging to an asset class; and
   the user further uses the graphical user interface to select the subset such that investment opportunities in the subset belong to a given asset class.

4. The apparatus set forth in claim 1 wherein:
   the analyzer performs operations belonging to a set thereof on the investment performance information; and
   the operations include computing a Hunter Ratio for an investment opportunity.

5. The apparatus set forth in claim 4 wherein:
   the Hunter Ratio is computed in the screening mode; and
   the operations include, in the fitting mode, using the investment performance information in computing a blend anxiety of the investment opportunities making up the pair.

6. The apparatus set forth in claim 1 wherein:
   the analyzer performs operations belonging to a set thereof on the investment performance information in screening mode; and
   the graphical user interface displays the results from the screening mode as a spreadsheet that the user manipulates, the spreadsheet having a row for each of the investment opportunities and a column for each of the operations.

7. The apparatus set forth in claim 1 wherein:
   the analyzer performs operations belonging to a set thereof on the investment performance information; and
   the user uses the graphical user interface to select a subset of the set of operations to be performed by the analyzer in the screening mode.

8. The apparatus set forth in claim 7 wherein:
   the user further uses the graphical user interface to select for a given operation in the subset a selected period of time within the covered period of time, the analyzer performing the given operation on the investment performance information for the selected period of time.

9. The apparatus set forth in claim 1 wherein:
   the user uses the graphical user interface to select a period of time within the covered period of time; and the analyzer analyzes the investment performance information over the selected period of time in the screening mode and/or the fitting mode.

10. The apparatus set forth in claim 1 wherein:
the graphical user interface displays the results as a spreadsheet that the user manipulates.

11. The apparatus set forth in claim 1 wherein:
the user uses the graphical user interface in the fitting mode to select a first subset and a second subset of the set of investment opportunities; and
each pair is made up of an investment opportunity from the first subset and an investment opportunity from the second subset.

12. The apparatus set forth in claim 11 wherein:
in the fitting mode, the results are displayed in a table having a row for each of the investment opportunities belonging to the first set and a column for each of the investment opportunities belonging to the second set: and
the results for each pair of the investment opportunities appear at the intersection of the row for the member of the pair from the first subset and the column for the member of the pair from the second subset.

13. The apparatus set forth in claim 12 wherein:
the analyzer computes for each pair a blend anxiety of the investment opportunities making up the pair using the investment performance information; and
the blend anxiety appears at the intersection for the pair.

14. The apparatus set forth in claim 13 wherein:
the blend anxiety is computed by computing the covariance of the investment performances of the investment opportunities making up the pair.

15. The apparatus set forth in claim 13 wherein:
the analyzer computes for each pair a correlation coefficient of the investment opportunities making up the pair using the investment performance information; and
the correlation coefficient appears at the intersection for the pair.

16. The apparatus set forth in claim 1 wherein:
in the fitting mode, the analyzer computes for each pair a blend anxiety of the investment opportunities making up the pair using the investment performance information; and
the displayed results show the pair and the blend anxiety.

17. The apparatus set forth in claim 16 wherein:
the blend anxiety is computed by computing the covariance of the investment performances of the investment opportunities making up the pair.

18. The apparatus set forth in claim 16 wherein:
in fitting mode, the analyzer further computes for each pair a correlation coefficient of the investment opportunities making up the pair using the investment performance information; and
the displayed results further show the correlation coefficient.

* * * * *